US009586785B2

(12) United States Patent
Tiberio et al.

(10) Patent No.: US 9,586,785 B2
(45) Date of Patent: Mar. 7, 2017

(54) APPARATUS FOR UNWINDING FLEXIBLE CABLES ON SEABEDS AND METHOD FOR LOADING A REEL OF FLEXIBLE CABLE ON SAID APPARATUS

(71) Applicant: INNOVO Engineering and Construction LTD, Aberdeen (GB)

(72) Inventors: Andrea Tiberio, Albignasego (IT); Stefano Malagodi, Sirmione (IT)

(73) Assignee: INNOVO ENGINEERING AND CONSTRUCTION LTD, Aberdeen (GB)

( * ) Notice: Subject to any disclaimer, the term of this patent is extended or adjusted under 35 U.S.C. 154(b) by 85 days.

(21) Appl. No.: 14/583,135

(22) Filed: Dec. 25, 2014

(65) Prior Publication Data

US 2016/0185565 A1 Jun. 30, 2016

(51) Int. Cl.
*F16L 1/024* (2006.01)
*B65H 49/32* (2006.01)
(Continued)

(52) U.S. Cl.
CPC .............. *B65H 49/32* (2013.01); *F16L 1/203* (2013.01); *F16L 1/207* (2013.01); *H02G 1/10* (2013.01);
(Continued)

(58) Field of Classification Search
CPC . F16L 1/203; F16L 1/207; F16L 1/235; F16L 1/16; B63B 35/03; B65H 49/32;
(Continued)

(56) References Cited

U.S. PATENT DOCUMENTS 1,732,175 A * 10/1929 Thompson ................ B66F 1/06
105/141
3,103,322 A * 9/1963 Garner .................... B21C 47/28
242/470
(Continued)

FOREIGN PATENT DOCUMENTS

WO     2009022177 A2    2/2009

*Primary Examiner* — Benjamin Fiorello
*Assistant Examiner* — Carib Oquendo
(74) *Attorney, Agent, or Firm* — Mark M. Friedman

(57) ABSTRACT

Apparatus for unwinding flexible cables on seabeds, which comprises a support structure (2) for a reel (5) on which a flexible cable (6) is wound, provided with two shoulders (4) each advantageously formed by two counter-facing towers (19), between which a seat (20) is defined susceptible for slidably receiving a hub-carrying group (7). Each shoulder (4) is associated with a plurality of aligned anchoring elements (12), a slidably movable reaction bar (13) guided in the aforesaid seat (20), and first and second locking means (14, 15), each mounted on the hub-carrying group (7) and on the reaction bar (13), able to be actuated to move between an interference position (A, A'), in which they intercept at least one anchoring element (12) constraining the hub-carrying group (4) or the reaction bar (13) to the relative shoulder (4), and a first non-interference position (B, B'), in which they are released from the anchoring elements (12), freeing the hub-carrying group (7) or the reaction bar (13) from the relative shoulder (4). Two first movement actuators (16), each of which mounted between a hub-carrying group (7) and the corresponding reaction bar (13), allow modifying the distance between them with the first or the second locking means (14, 15) in non-interference position (B, B').

11 Claims, 16 Drawing Sheets

(51) Int. Cl.
 *F16L 1/20* (2006.01)
 *H02G 1/10* (2006.01)
 *H02G 11/02* (2006.01)

(52) U.S. Cl.
 CPC .......... *B65H 2701/34* (2013.01); *H02G 11/02* (2013.01)

(58) Field of Classification Search
 CPC .... B65H 49/36; B65H 2701/34; B65H 54/54; H02G 1/10; E21B 19/22
 See application file for complete search history.

(56) References Cited

U.S. PATENT DOCUMENTS

| | | | | |
|---|---|---|---|---|
| 3,722,775 | A * | 3/1973 | Sarracino | H02G 1/10 226/100 |
| 4,447,012 | A * | 5/1984 | Woodruff | B65H 16/06 242/423.1 |
| 4,454,999 | A * | 6/1984 | Woodruff | B65H 49/34 242/388.7 |
| 4,679,743 | A * | 7/1987 | Dallmaier | B65H 54/553 242/129.51 |
| 4,684,310 | A * | 8/1987 | Stange | B60B 29/001 187/207 |
| 5,088,654 | A * | 2/1992 | Cielker | B66F 3/24 242/591 |
| 5,242,127 | A * | 9/1993 | Jaaskelainen | B65H 54/54 242/557 |
| 2010/0104374 | A1 | 4/2010 | Hall | |
| 2012/0217690 | A1 | 8/2012 | Jenkins | |

\* cited by examiner

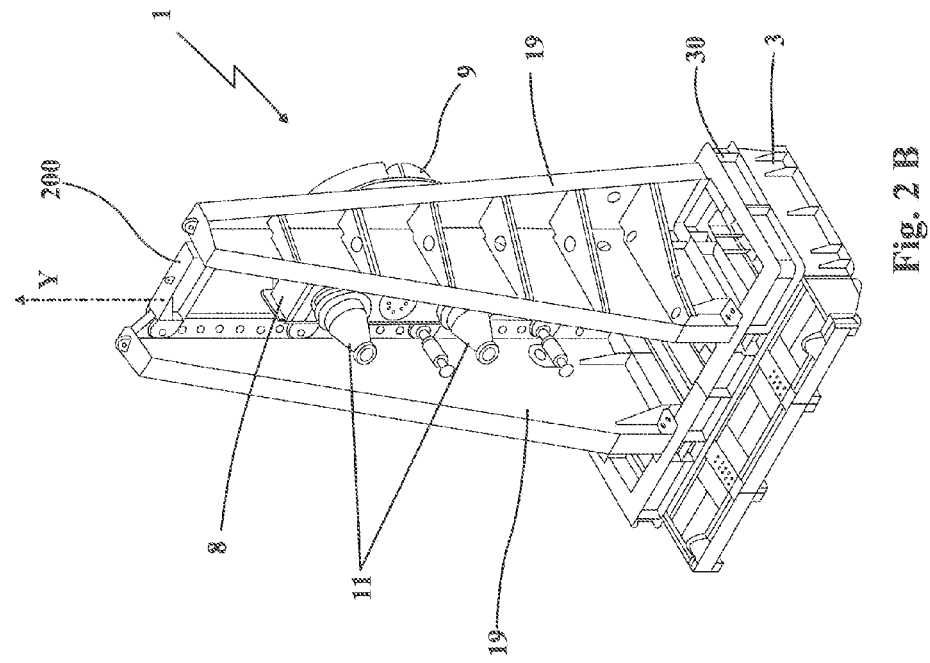
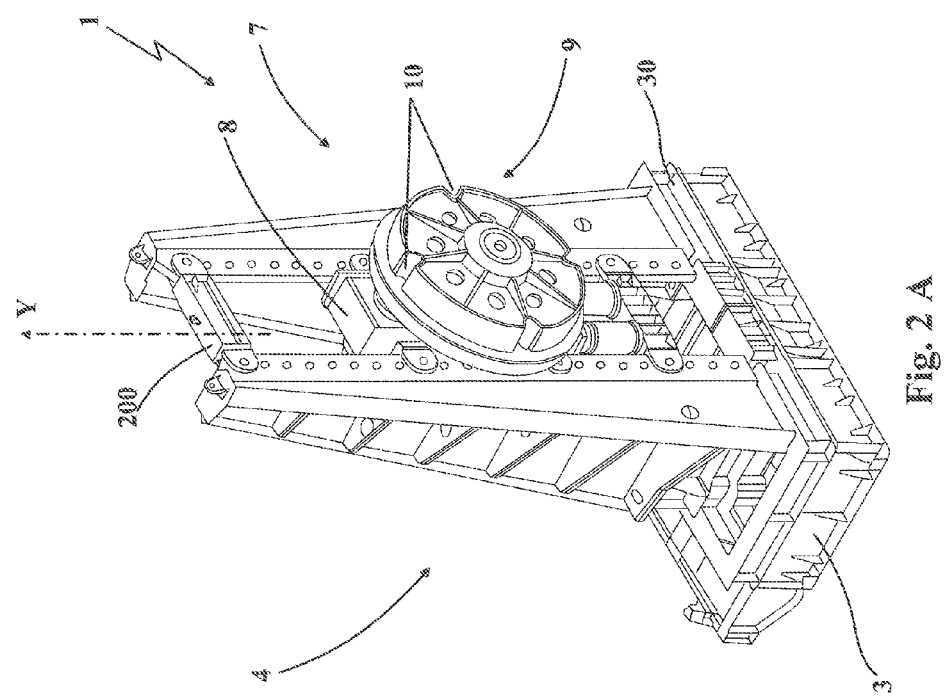

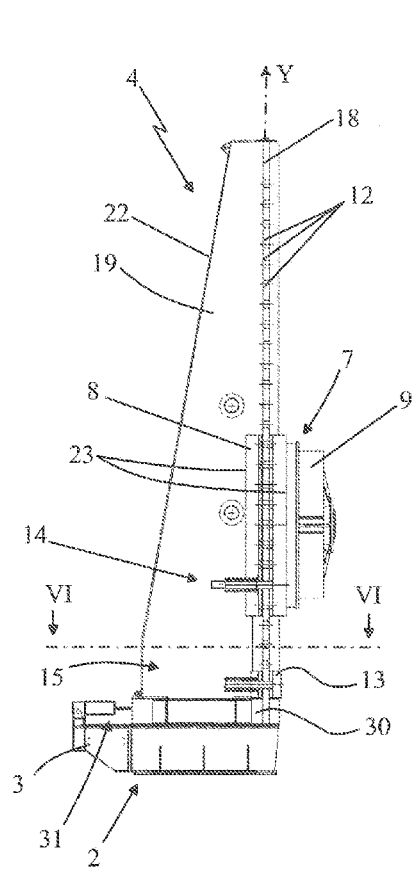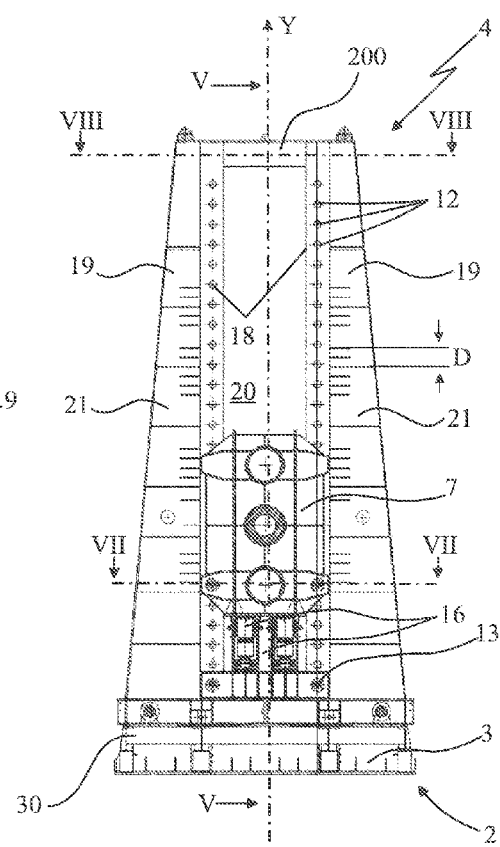
Fig. 4
Fig. 3

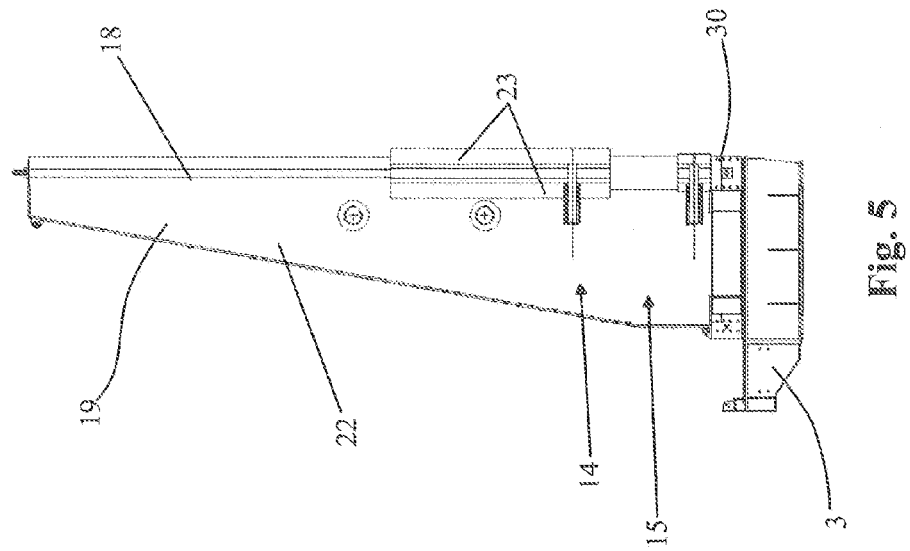
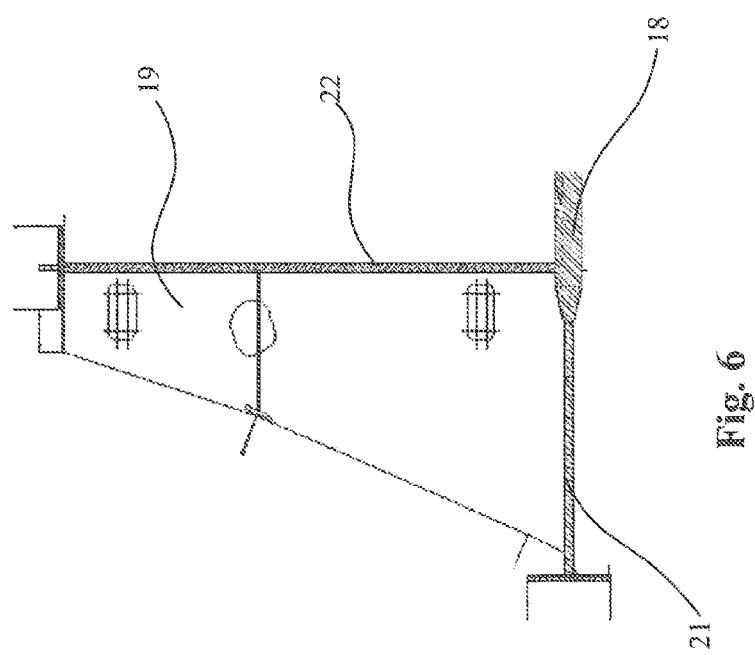

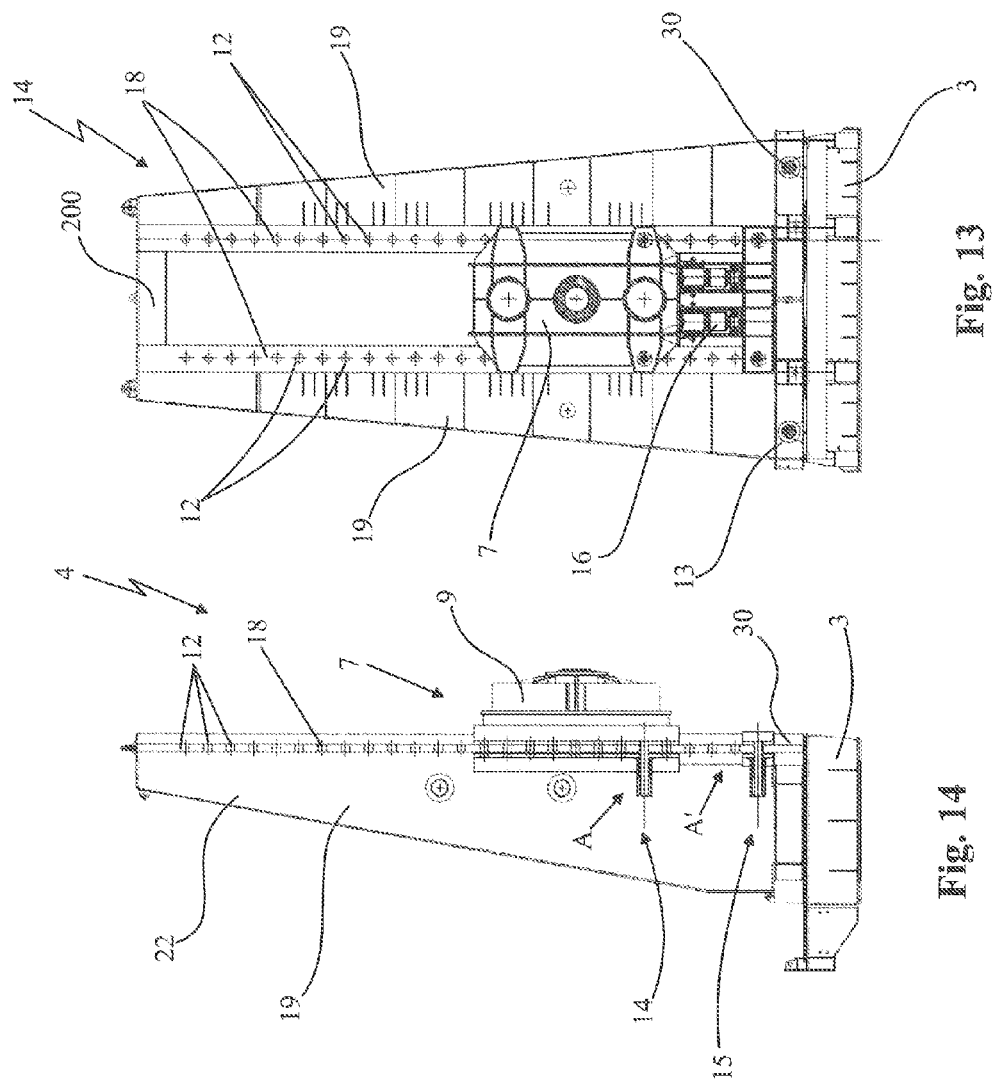

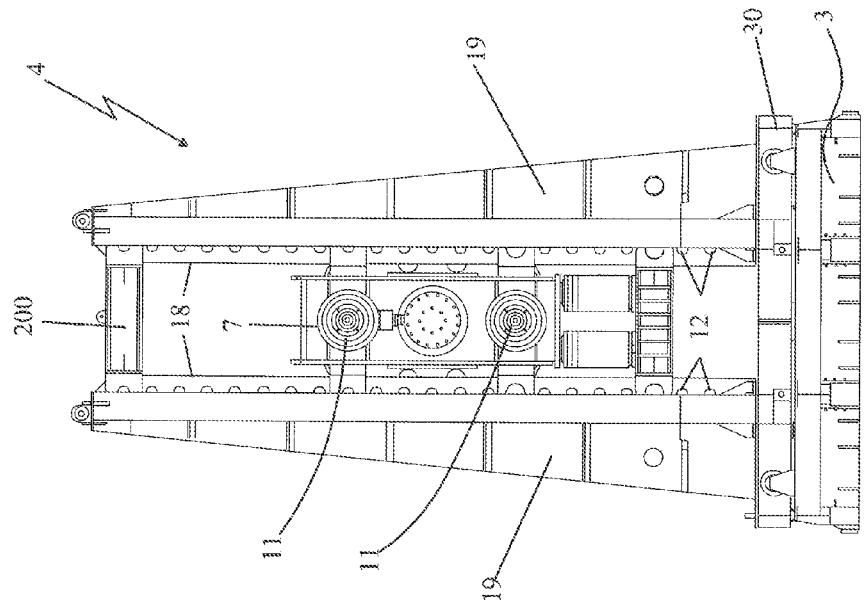
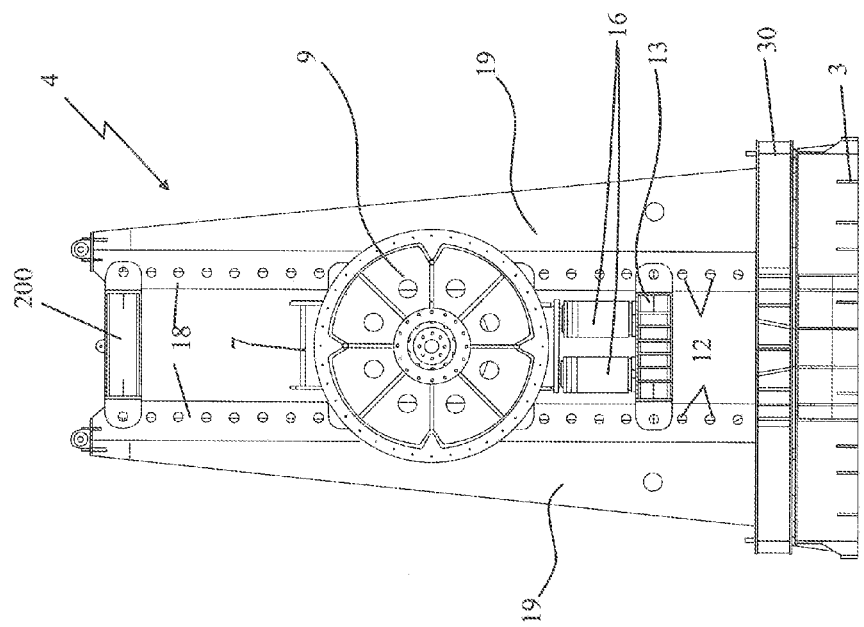

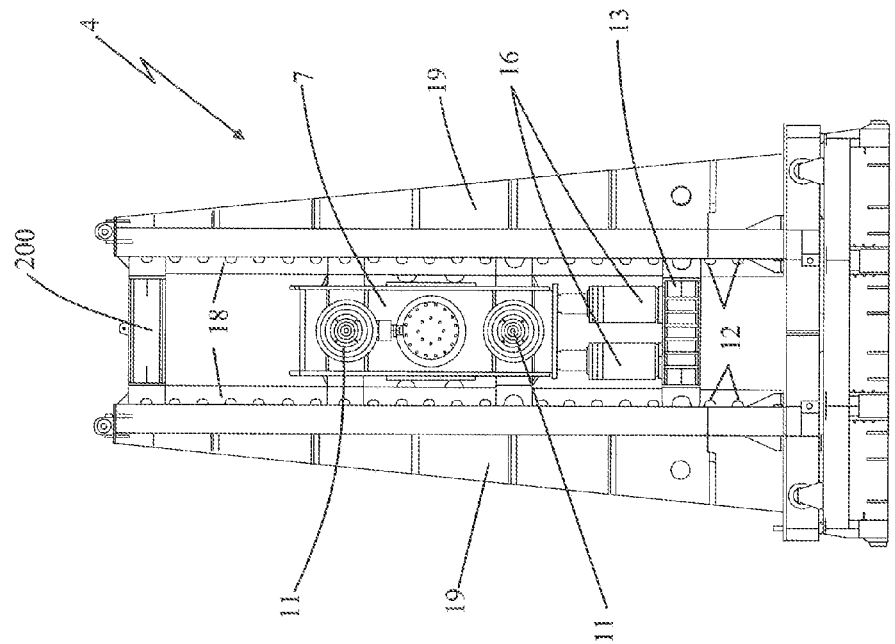
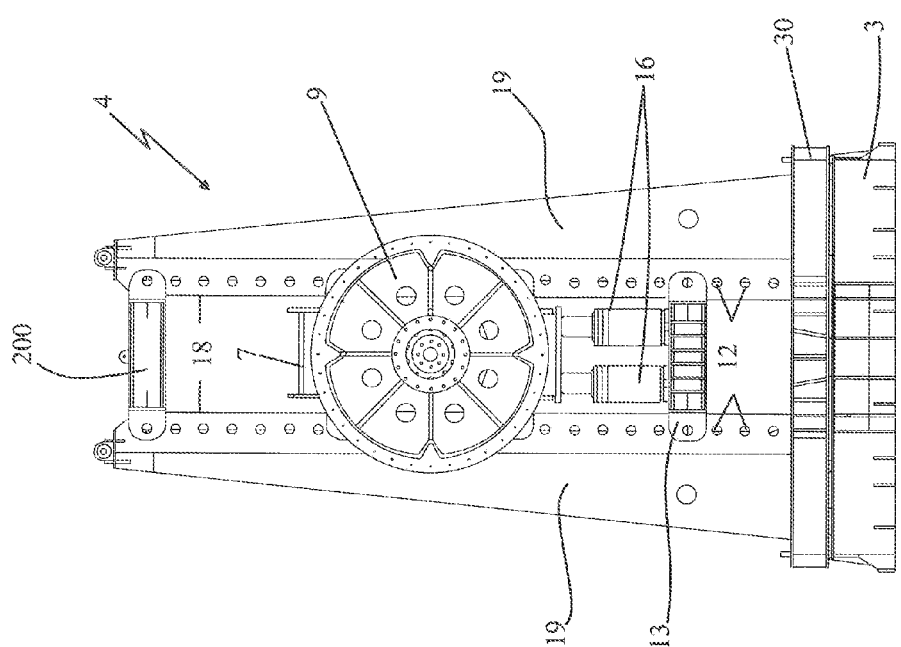

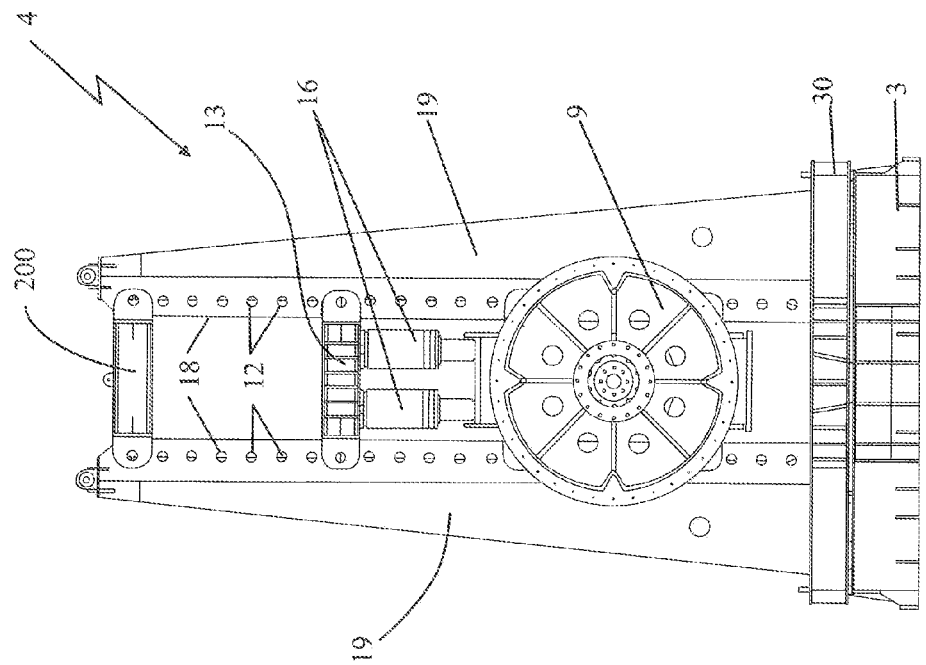
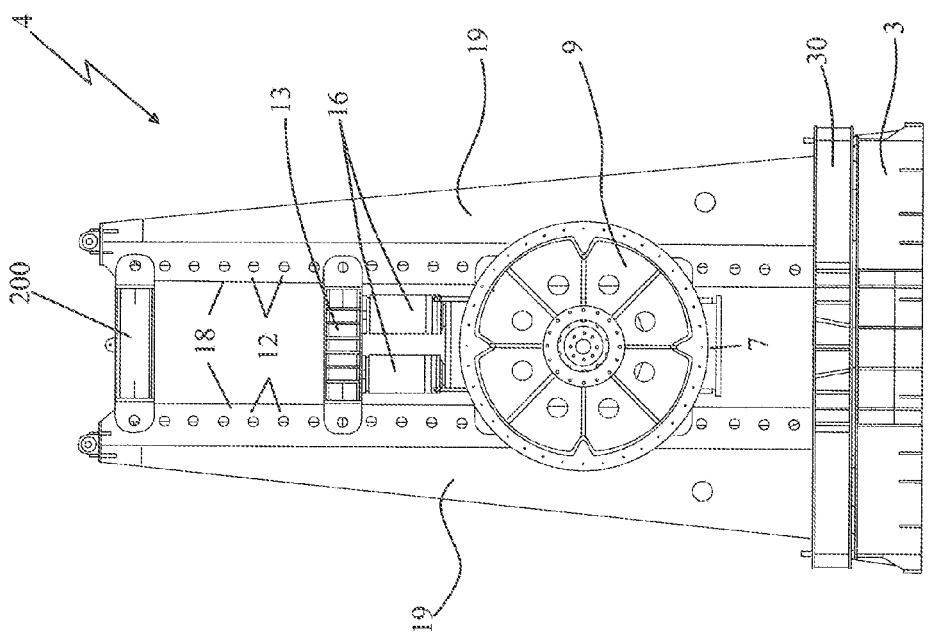

APPARATUS FOR UNWINDING FLEXIBLE CABLES ON SEABEDS AND METHOD FOR LOADING A REEL OF FLEXIBLE CABLE ON SAID APPARATUS

FIELD OF APPLICATION

The present invention regards an apparatus for unwinding flexible cables on seabeds and a method for loading a reel of flexible cable on said apparatus according to the preamble of the respective independent claims.

The present apparatus is intended to be mounted on ships for unwinding, on a seabed, a reel of flexible cable, such as an energy transmission cable, a signal cable for data transmission (e.g. made of optical fiber), a flexible tube and more generally a flexible umbilical cord for many different applications. The cables associated with the apparatus, object of the present invention, can thus be constituted by any one elongated flexible element intended to be laid offshore and typically having a diameter comprised between 4 and 8 inches and a weight comprised between 20 and 50 kg per linear meter.

Therefore, the apparatus and the method, object of the present invention, fall within the industrial field of production of offshore equipment and are intended for use in the field of laying flexible cables on beds of seas, lakes, basins etc.

STATE OF THE ART

As is known, the apparatuses for unwinding the cables on seabeds conventionally comprise a reel for winding and/or unwinding a flexible cable and a support structure formed by a base block and by two shoulders, which rise for several meters parallel to each other starting from the base block, and which rotatably support a reel between them.

More in detail, each shoulder is preferably obtained by means of two parallel and counter-facing towers, between which a hub-carrying group that supports the shaft of the reel is slidably engaged in opposite guides.

The reel is usually constituted by a drum with the cable externally wound thereon, which is rotated by motor means directly mounted on the hub-carrying group.

At least two vertical hydraulic pistons are provided for, each of which mounted between the two towers of each shoulder for the lifting and lowering of the reel between a lowered loading position and a raised work position.

Two horizontal hydraulic pistons are also provided for, mounted on the base block, in order to move the two shoulders towards or away from each other along rails.

In operation, in order to load a reel on the apparatus the following sequence of operations is generally provided for.

First, a reel is loaded that is supported by a metalwork saddle on the deck of a ship, by means of a crane, preferably a wharf crane, and then the reel is moved on the saddle by means of for example the lateral crane of the deck of the ship, between the two shoulders of the apparatus previously moved apart from each other in order to allow the interposition of the reel. At this point, the hub-carrying groups are vertically lifted by the vertical pistons until they are counter-facing, in a precise manner, with the ends of the drum of the reel. The two shoulders are then brought close together by means of the actuation of the horizontal pistons, in order to bring the pinions of the hub-carrying groups to engage provided ring gears integral with the drum of the reel, as well as to bring the support shafts for the hub-carrying groups to rotatably engage in the respective bearings of the drum of the reel.

At the end of the process of mounting on the apparatus for its unwinding, the reel must be situated at a height of several dozen centimeters from the base block for its controlled rotation and for the unwinding of the cable on the seabed.

As is known, the reels of flexible cable have considerable weight, typically hundreds of tons, and the length and radius (hence height) sizes can vary as a function of the manufacturing company, of the characteristics of the cable to be unwound and the length of the latter.

The apparatuses for unwinding cables must therefore be able to receive reels of different sizes and allow their loading and unloading in a safe and quick manner.

In particular, in fact, on a same ship multiple reels of different sizes can be loaded on board, each mounted on its own saddle; such reels must then in sequence be unwound on the seabed in order to release the relative cable.

The apparatuses of known type currently only partly meet the need of the market to ensure versatility of use of reels having different size characteristics and in particular with different radius. For such purpose, the apparatuses of known type generally provide vertical pistons for lifting and lowering the reels between the work and loading/unloading positions, provided with a limited travel, typically about one meter length. Such circumstance involves a sizing of the pistons that negatively affects the costs of the apparatus. In addition, a similar limited travel is not sufficient for covering the entire size range of the reels present on the market, such that it is often necessary to provide for multiple apparatuses, each intended for unwinding reels comprised within a preset size interval, with clear increase of costs.

The adjustment capacity of the currently known apparatuses is therefore limited to the travel of the lifting pistons, which as stated is usually about a meter. Such adjustment capacity also depends on the height of the metalwork of the apparatus with respect to the deck of the ship.

In order to overcome this drawback, it is for example known to employ spacers to be associated with the support saddles of the reels in order to vary the height thereof from the ground within values reachable by the lifting pistons, with however clearly high costs and considerable problems for the substitution of a reel with another of different size.

PRESENTATION OF THE INVENTION

The problem underlying the present invention is therefore that of overcoming the drawbacks of the abovementioned prior art, by providing an apparatus for unwinding flexible cables on seabeds which is capable of working in a versatile manner with reels of very different sizes.

Further object of the present invention is to provide an apparatus for unwinding flexible cables on seabeds which provides means for lifting the reels capable of working with reels of different sizes, in an entirely safe manner and entirely reliable in operation.

Another object of the present invention is to provide a method for loading/unloading a reel of flexible cable on/from an apparatus for the unwinding thereof, which can be employed in a versatile manner for reels of different sizes.

Another object of the present invention is to provide a method for loading/unloading a reel of flexible cable on/from an apparatus for the unwinding thereof, which is entirely safe and can in particular also be actuated in open sea.

BRIEF DESCRIPTION OF THE DRAWINGS

The technical characteristics of the finding, according to the aforesaid objects, can be clearly found in the contents of the below-reported claims and the advantages thereof will be more evident in the following detailed description, made with reference to the enclosed drawings, which represent two merely exemplifying and non-limiting embodiments of the invention, in which:

FIG. 2A shows a front perspective view of an apparatus for unwinding flexible cables, object of the present invention;

FIG. 2B shows a front perspective view of an apparatus for unwinding flexible cables, object of the present invention;

FIG. 3 shows a front view of a shoulder and of several members mounted thereon of the apparatus for unwinding flexible cables on seabeds, object of the present invention;

FIG. 4 shows a side view of the shoulder and the members of FIG. 3;

FIG. 5 shows a longitudinal section view of just the shoulder of FIG. 3 carried out along the line V-V of the same FIG. 3;

FIG. 6 shows a cross section view of just the shoulder of FIG. 4 carried out along the line VI-VI of the same FIG. 4;

FIG. 13 shows a shoulder of the apparatus, object of the present invention, with the movable members arranged in a first mechanical configuration and illustrated in the minimum height position thereof;

FIG. 14 shows a side view of the shoulder and the members of FIG. 13;

FIGS. 21A, 22A, 21B, 22B show a shoulder of the apparatus, object of the present invention, with the movable members arranged in the first mechanical configuration and illustrated in an intermediate height position thereof with two first movement actuators respectively illustrated in collected position and in extended position in a front view in (FIG. 21A, 22A) and in a rear view (FIG. 21B, 22B);

FIGS. 23, 24 show a shoulder of the apparatus, object of the present invention, with the movable members arranged in the second mechanical configuration and illustrated at a front part in an intermediate height position thereof with two first movement actuators respectively in collected position and in extended position;

FIGS. 25A-31B schematically show an operating sequence of steps for the movement of the movable members of the apparatus for unwinding flexible cables on seabeds, object of the present invention.

DETAILED DESCRIPTION OF A PREFERRED EMBODIMENT

Figure 1:
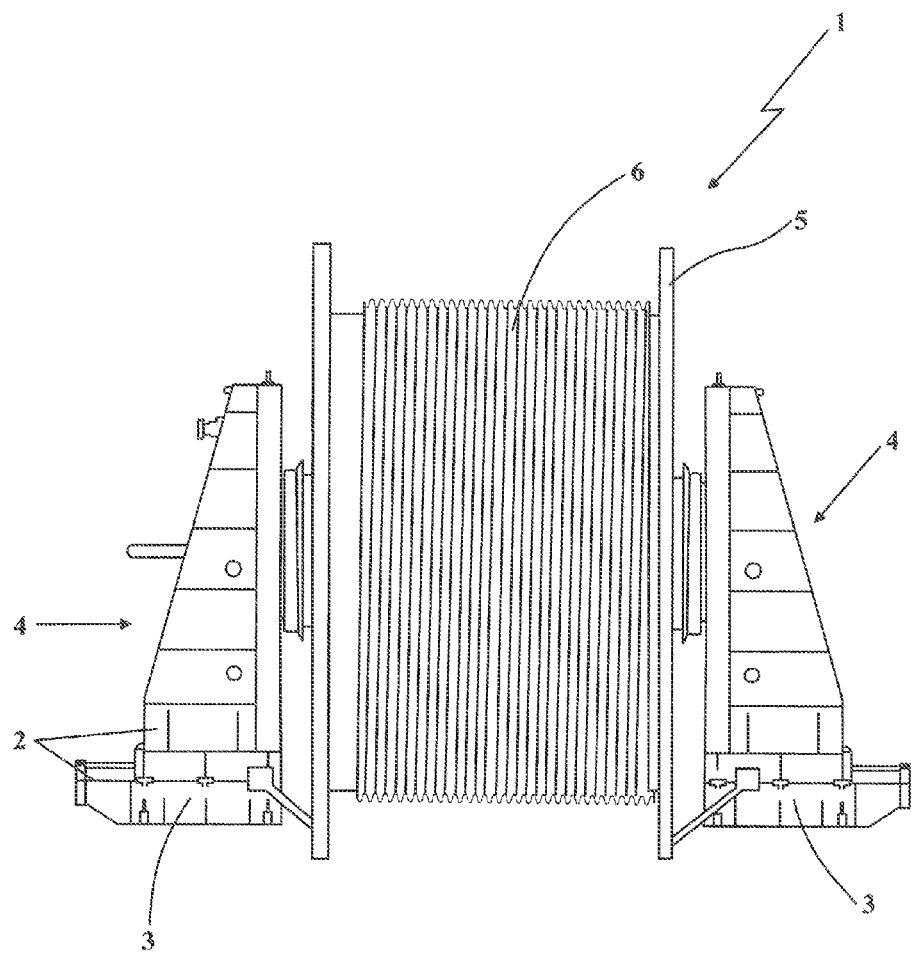
FIG. 1 shows a front view of an apparatus for unwinding flexible cables of the type that is object of the present invention.
Figure 7:
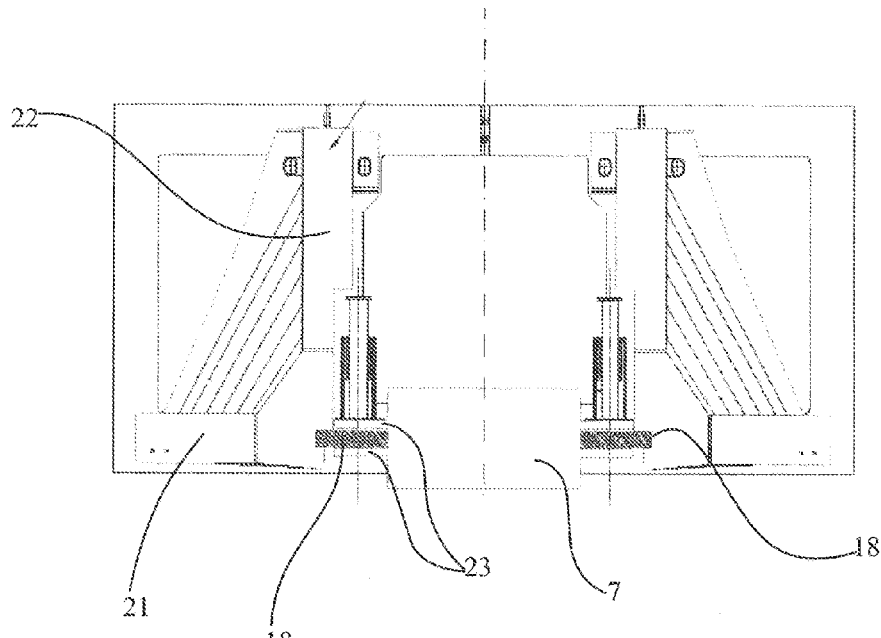
FIG. 7 shows a cross section view of the shoulder and the members of FIG. 3 carried out along the line VII-VII of the same FIG. 3.
Figure 8:
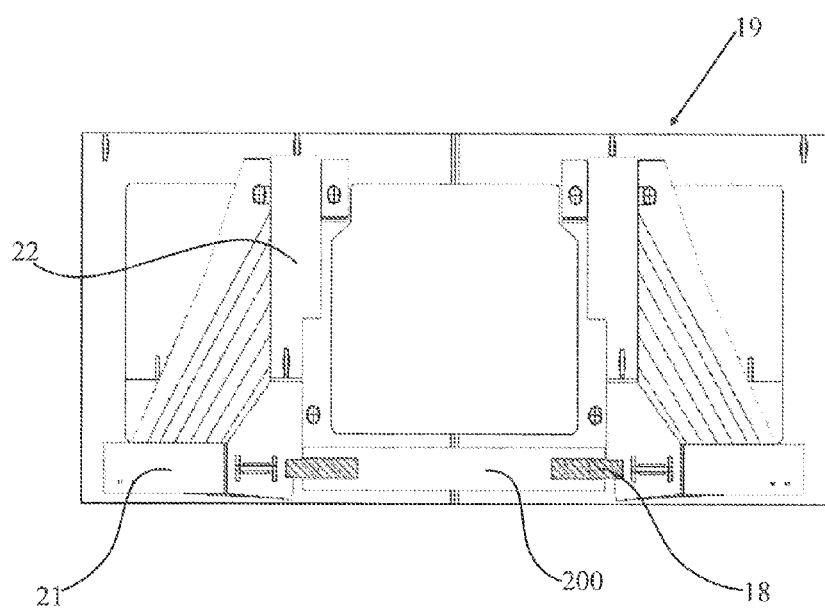
FIG. 8 shows a cross section view of the shoulder of FIG. 3 carried out along the line VIII-VIII of the same FIG. 3.
Figure 10:
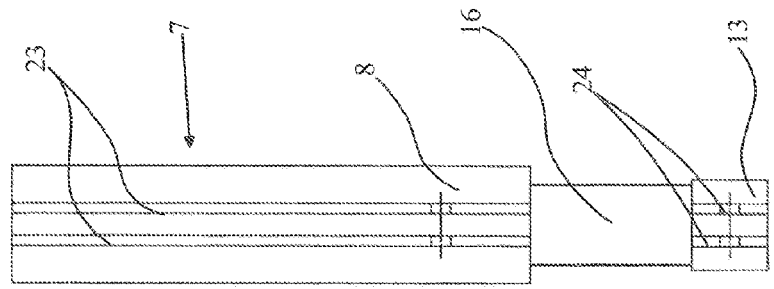
FIG. 10 shows a side view of the members of FIG. 9.
Figure 9:
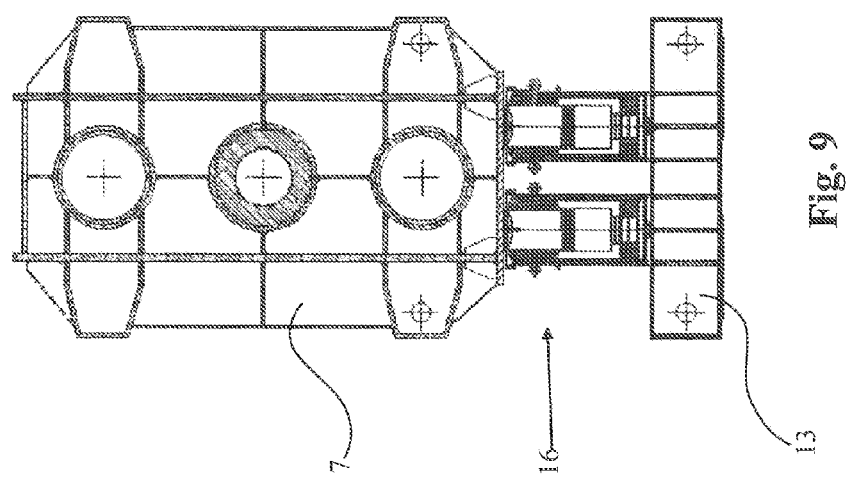
FIG. 9 shows a front view of a detail of the apparatus, object of the present invention, relative to a hub-carrying group, to first actuators and to one reaction bar.
Figure 11:
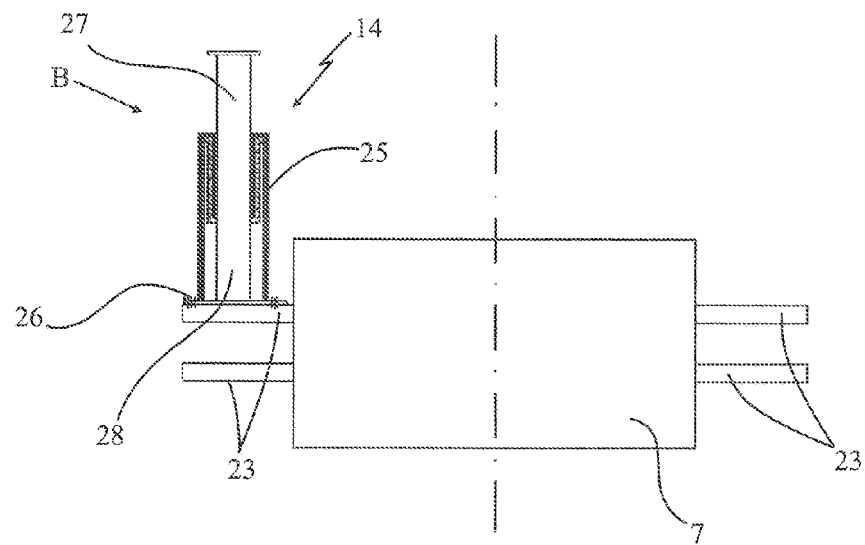
FIG. 11 shows a schematic view in cross section of a detail of the apparatus, object of the present invention, relative to first locking means mounted on the hub-carrying group.
Figure 12:
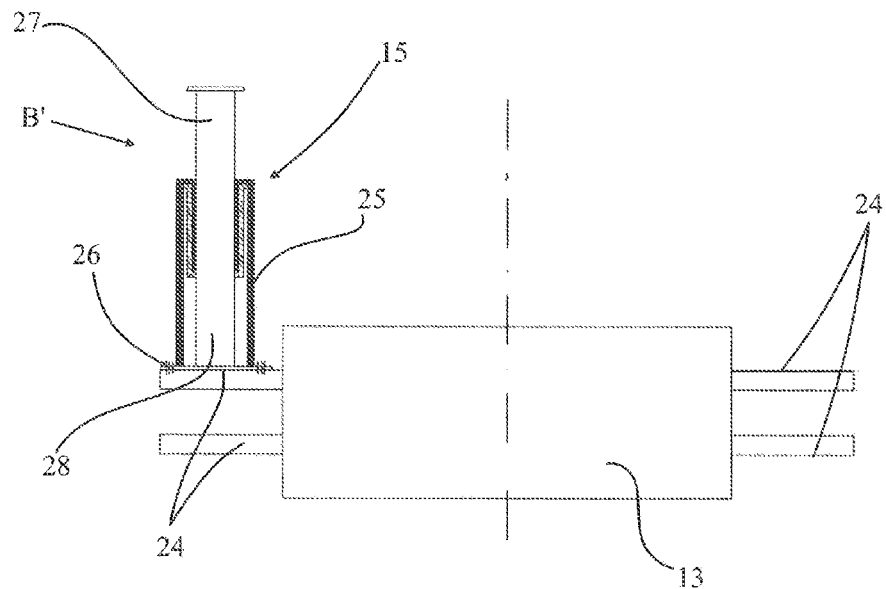
FIG. 12 shows a schematic view in cross section of a detail of the apparatus, object of the present invention, relative to second locking means mounted on the reaction bar.
Figures 15, 16:
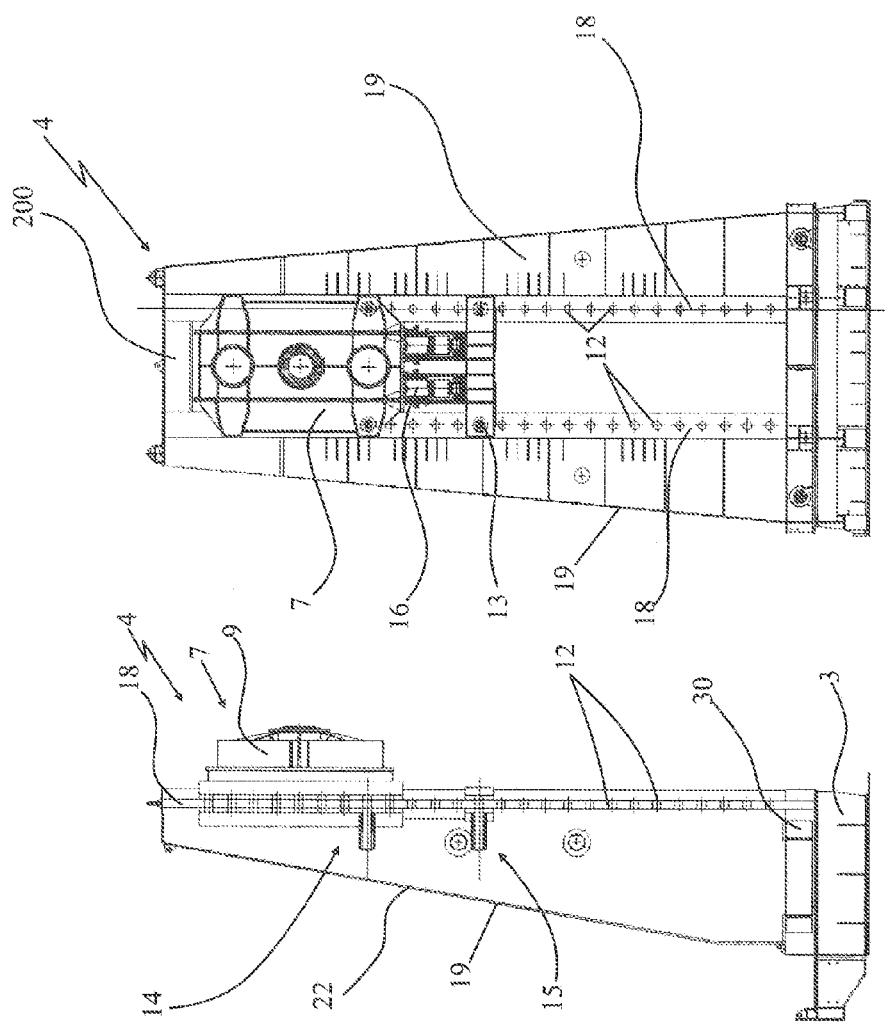
FIG. 15 shows a shoulder of the apparatus, object of the present invention, with the movable members arranged in the first mechanical configuration and illustrated in the maximum height position thereof.
FIG. 16 shows a side view of the shoulder and the members of FIG. 15.
Figure 17:
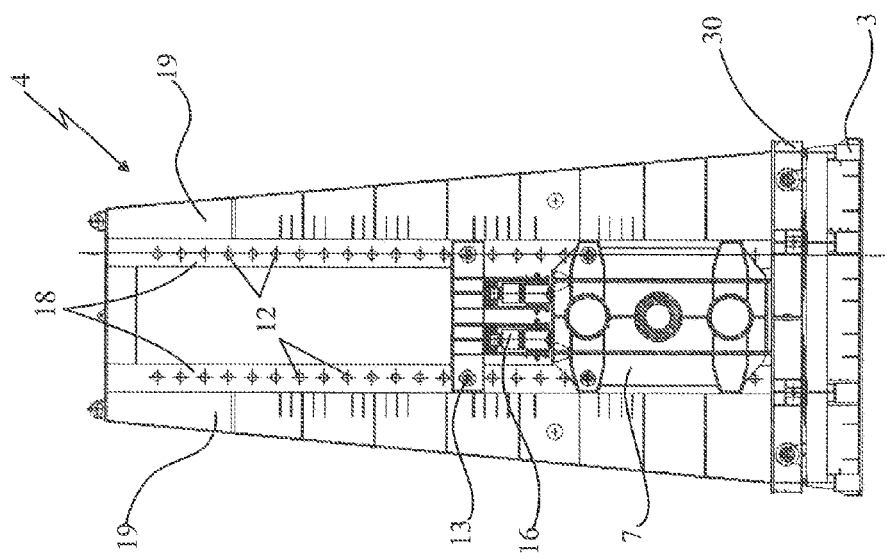
FIG. 17 shows a shoulder of the apparatus, object of the present invention, with the movable members arranged in a second mechanical configuration and illustrated in the minimum height position thereof.
Figure 18:
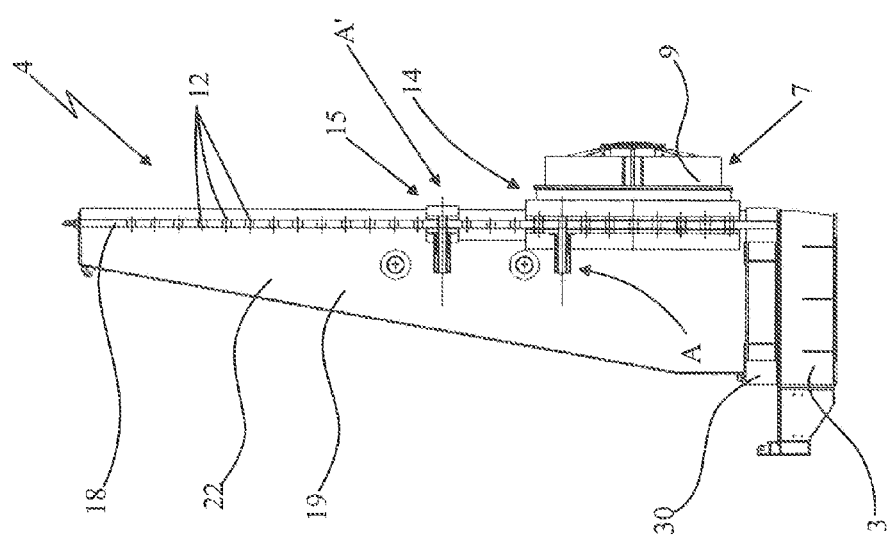
FIG. 18 shows a side view of the shoulder and the members of FIG. 17.
Figure 19:
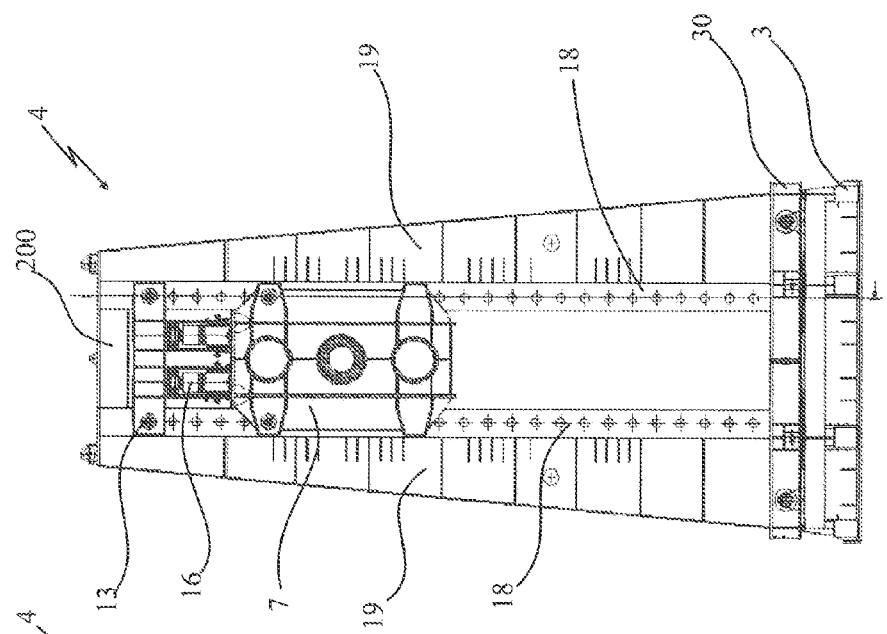
FIG. 19 shows a shoulder of the apparatus, object of the present invention, with the movable members arranged in the second mechanical configuration and illustrated in the maximum height position thereof.
Figure 20:
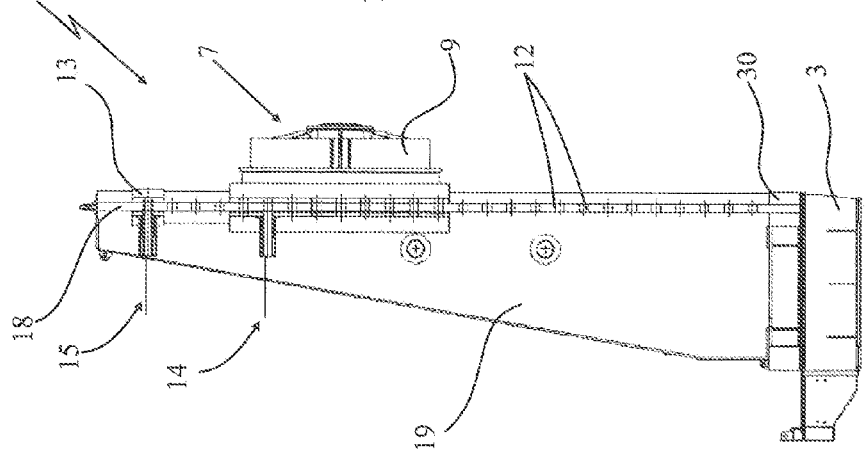
FIG. 20 shows a side view of the shoulder and the members of FIG. 19.

With reference to the set of drawings, reference number 1 indicates overall an apparatus for unwinding flexible cables on seabeds.

The apparatus 1 for unwinding flexible cables on seabeds comprises, in a per se known manner, a support structure 2 provided with a base block 3 and with two shoulders 4, which rise from the base block 3 parallel to each other in a substantially vertical extension direction.

The two shoulders 4 are spaced apart for a distance sufficient to house a reel 5 for storing a flexible cable 6.

The cable storage reel 5 is provided, in an entirely conventional manner, with a steel drum with substantially cylindrical shape, which is horizontally extended between two ends carrying the flexible cable 6 externally wound thereon.

The latter can consist of an energy transmission cable, a signal cable for data transmission (e.g. made of optical fiber), and a flexible tube and more generally it can consist of a flexible umbilical cord, or more generally by a flexible elongated body intended for many different applications.

Each shoulder 4 is mechanically associated with a hub-carrying group 7, which is adapted to transmit the motion to the reel 5 as well as to support the reel on the corresponding shoulder 4.

Each hub-carrying group 7 is slidably guided to move along a corresponding shoulder 4 in the vertical extension direction Y, and is susceptible to being mechanically engaged at one end to the reel 5.

For such purpose, the hub-carrying group 7 preferably comprises a metallic support body 8 with box-like shape, for example substantially with parallelepiped form, which centrally and rotatably carries a motion transmission hub 9 mounted thereon. Such hub 9 has the shape of a cylindrical body, peripherally provided with notches 10 adapted to be coupled in corresponding teeth obtained on the internal profile of a connection flange (not illustrated since of type per se known to the man skilled in the art) fixed to the end of the drum of the reel 5, in order to transmit the rotation thereto for the winding and unwinding of the cable 6.

On the support body 8 of the huh-carrying group 7, a shaft is centrally fixed which, by traversing the transmission hub 9, is rotatably engaged in a bearing fixed on the end flange of the drum of the reel 5.

On the support body 8 of the hub-carrying group 7, at least one motor 11 of electric or hydraulic type 11 is also mounted, which engages with a pinion in a toothed wheel provided for inside the transmission hub 9, in order to rotate the latter and the reel 5 therewith. Preferably, in accordance with the embodiment of FIG. 2B, two motors 11 are provided for, arranged in diametrically opposite positions with respect to the central shaft in order to engage with the relative pinions in two diametrically opposite positions of the transmission hub 9.

Both the hub-carrying groups 7 associated with the two shoulders 4 can be motorized, i.e. a motorized master hub-carrying group and a following slave hub-carrying group can be provided for.

According to the idea underlying the present invention, the apparatus 1 further comprises, for each shoulder 4, a plurality of anchoring elements 12 arranged aligned in sequence along the direction Y of vertical extension of the same shoulder 4.

Also provided for are two reaction bars 13, each of which slidably mechanically guided on a corresponding shoulder 4 in order to move along the aforesaid vertical extension direction Y.

Each hub-carrying group 7 supports first locking means 14 able to be actuated to move between a first interference position A, in which the first locking means 14 intercept at least one anchoring element 12 of the relative shoulder 4, constraining the hub-carrying group 7 to the shoulder 4 itself with respect to movements along the vertical extension direction Y, and a first non-interference position B, in which such first locking means 14 are released from the anchoring elements 12 of the shoulder 4, freeing the hub-carrying group 7 from the shoulder 4 in order to allow movements thereof along the vertical extension direction Y.

Two second locking means 15 are each mounted on a corresponding reaction bar 13 associated with one shoulder 4, and are able to be actuated to move between a second interference position A', in which the second locking means 15 intercept at least one anchoring element 12 of the shoulder 4, constraining the reaction bar 13 to the shoulder 4 itself with respect to movements along the vertical extension direction Y, and a second non-interference position B', in which the second locking means 15 are released from the anchoring elements 12 at the shoulder 4, freeing the reaction bar 13 from the shoulder 4 itself in order to allow movements thereof along the vertical extension direction Y.

The apparatus 1 further comprises at least two first movement actuators 16, each associated with one shoulder 4 and each mounted between the relative hub-carrying group 7 and a corresponding reaction bar 13, in order to modify the distance between them when, selectively, a member selected from among the hub-carrying group 7 and the reaction bar 13 has the corresponding locking means 14, 15 in non-interference position B, B', so as to allow the movement thereof under the action of the corresponding first actuator 16.

Preferably, in order to balance the forces, two first movement actuators 16 are provided for, associated with each shoulder 4 and, as described hereinbelow, housed within the seat 20 defined between the two towers 19 provided with each shoulder 4.

The first movement actuator 16 associated with one shoulder 4 can be controlled to be extended, in order to move the hub-carrying group 7 and the reaction bar 13 away from each other, or it can be controlled to be shortened, in order to move the hub-carrying group 7 and the reaction bar 13 closer together. Of course, as indicated above, in order to allow each first actuator 16 to be extended or shortened, at least one of the two members movable in a guided manner along the shoulder 4, or at least one from among the hub-carrying group 7 and the reaction bar 13, must be released from the shoulder 4 in order to be able to slide thereon along the vertical direction Y, having the corresponding locking means 14 or 15 mounted in non-interference position B, B'. In this manner, the other movable member 13, 7 will instead be constrained to the shoulder 4, having the corresponding locking means 14 or 15 mounted in interference position A, A' in order to allow the reaction first actuator 16 by unloading the force on the shoulder 4 of the support structure 2.

The movement of one of the two movable members 7, 13, produced by the first actuators 16, can correspond to the distance that separates two anchoring elements 12 and advantageously can be equal to the segment that separates two successive anchoring elements 12, so as to allow the locking elements 14, 15 to mechanically constrain the movable member 7, 13 to the shoulder 4, after such member has been moved and has reached the new displaced position of such predefined segment, along the vertical direction Y.

In this manner, it is possible to move the two movable members 7, 13 with successive travel segments (advantageously equal to the distance between two anchoring elements 12 or for a multiple travel of such distance). Of course, given the limited travel of the first actuators 16, in order to be able to repeat the movement of a first movable member 7, 13 in a same sense of the vertical movement direction Y, it will be necessary to first recover the second member 13, 7, making the two members approach each other by an equal segment through the collection actuation of the first actuators 16, after having suitably released the locking means of such second movable member.

The weight of the reel 5, which usually can be several hundred tons, lies on the two hub-carrying groups 7. The movement of the reel 5 can therefore occur with low pitches (in both senses of the vertical direction Y) of extension preferably equal to the distance between two anchoring elements 12, corning to recover, after each movement pitch of the reel 5 (i.e. of the hub-carrying group 7), the reaction bar 13 in order to progressively constrain it with the relative locking means 14, 15 in new positions defined by the sequence of aligned anchoring elements 12.

The operative function of the apparatus whose structure is described above will be clearer in the description reported below of the method for loading the reel 5 on an apparatus 1 for unwinding flexible cables 6 on seabeds.

In accordance with a preferred embodiment of the present invention, the anchoring elements 12 consist of a plurality of aligned holes provided for on at least one substantially vertical wall of each shoulder 4.

The holes 12 are extended along the vertical extension direction of the shoulder 4 and are spaced apart from each other, preferably in a constant manner, by a segment D, advantageously on the order of 20-40 cm.

Preferably, each shoulder 4 is formed by two parallel towers 19, which together with the base block 3 delimit a seat 20, at whose interior the corresponding hub-carrying group 7 is housed.

Each tower 19 is obtained with a metalwork structure, preferably comprising a front wall 21, which is vertically extended from the base block 2, and a rear wall 22 which is also vertically extended and is orthogonally fixed behind the front wall 21. Between the aforesaid two walls 21, 22, a plurality of metal reinforcing brackets can be provided for.

The two towers 19 that make up a shoulder 4 are connected at the upper end by a small reinforcing beam 200 which at the upper part closes the seat 20; they are connected at the lower part by a base 30 which rests on the base block 2. Between the base block 2 and the shoulder 4, or preferably between the base block 2 and the base 30 of the shoulder 4, at least one second actuator 31 (and preferably two second actuators 31) is mechanically connected, which is susceptible to move the two shoulders 4 towards or away from each other. For such purpose, the base 30 rests on the base block 2 preferably by means of a rail (not illustrated in detail in the drawings).

The aforesaid towers 19 are provided with two first guides, counter-facing each other, in which a corresponding hub-carrying group 7 is slidably engaged, and two second guides in which a corresponding reaction bar 13 is slidably engaged.

Advantageously the aforesaid guides are both obtained with a single projecting wall 18 placed as a continuation of the front wall 21 with a portion with increased thickness, which is extended, starting from the rear wall 22, inside the seat 20 towards the opposite tower 19.

Such projecting wall 18 carries, advantageously associated, the aforesaid plurality of anchoring elements 12 preferably consisting, as stated, of aligned holes arranged at constant distance D along the extension of the wall 18 in the vertical extension direction Y of the shoulder 4.

The aforesaid projecting wall 18 is susceptible to externally guide two parallel and laterally fixed first plates 23, projecting at each support body 8 of the hub-carrying group 7, as well as two parallel, laterally fixed second plates 24 projecting at each reaction bar 13.

The first and the second locking means 14, 15, mentioned above, and respectively associated with the hub-carrying group 7 and the reaction bar 13, are each advantageously obtained with at least one third actuator provided with a fixed jacket 25, respectively made integral with the hub-carrying group 7 and with the reaction bar 13 by means of a connection flange 26; such third actuator is also provided with a movable stein 27 carrying an associated stop element 28 able to be actuated to project towards the shoulder 4 in order to interfere with the anchoring elements 12 when the first or the second locking means 14, 15 are actuated respectively to move into the first or into the second interference position A, A'.

Each third actuator 14, 15 can be advantageously obtained with a cylinder with through stem 27 whose end portion acts as stop element 28.

Advantageously, in accordance with the embodiment illustrated in the enclosed figures, the first locking means 14, associated with each hub-carrying group 7, are obtained with a third actuator of through stem type, mounted fixed, by means of the aforesaid connection flange 26, to one of the two lateral ends of the support body 8 of the hub-carrying group 7 on one of the two parallel first plates 23 with the through stem aligned on the sequence of aligned holes 12 obtained on the projecting wall 18 interposed between the two parallel first plates 23 in order to guide them along the vertical direction Y.

Analogously, in accordance with the embodiment illustrated in the enclosed figures, the second locking means 15 associated with each reaction bar 13 are obtained with a third actuator of through stem type, mounted fixed, by means of the aforesaid connection flange 26, to one of the two parallel second plates 24 laterally fixed to the reaction bar 13, with the through stem aligned on the sequence of holes 12 obtained on the projecting wall 18 interposed between the two parallel second plates 24 in order to guide them along the vertical direction Y.

In accordance with the embodiment of FIGS. 3, 4, 9, 10, 13-16, 21, 22, inside each seat 20 defined between the two towers 19 of a shoulder 4, the following are housed in sequence and in order starting from the base block: the reaction bar 13, two first movement actuators 16 and a hub-carrying group 7.

Otherwise, in accordance with the embodiment of FIGS. 17-20, 23, 24 inside each seat 20 defined between the two towers 19 of a shoulder 4, the following are housed in sequence and in order starting from the base block: a hub-carrying group 7, two first movement actuators 16 and the reaction bar 13.

The two possibilities for mounting the hub-carrying group 7 and the reaction bar 13 confer to the apparatus 1, object of the present invention, a high versatility of adaptation for mounting reels 5 of different sizes.

In accordance with the first embodiment, the reaction bar 13 and the first movement actuators 16 move the hub-carrying group 7 away from the base block 2 and therefore do not allow picking up reels 5 with excessively low heights or small size reels, and thus provided with very small central rotation axis. On the other hand, such embodiment allows lifting the reels 5 up to very high elevations, i.e. with the hub-carrying group 7, which reaches up to the upper end of the towers 19, therefore being adapted to operate with reels with very large size.

In accordance with the second embodiment, the bulk of the reaction bar 13 and of the first movement actuators 16 is overturned towards the top of the seat 20 such that the hub-carrying group 7 is in a position closer to the base block 2.

Therefore, in accordance with this second embodiment, it is possible to pick up reels 5 even of very small size, and thus provided with very small rotation axis, allowing them to engage with the two hub-carrying groups 7 even close by the base block 2.

The first embodiment allows lifting reels 5 even of large size without employing overly high towers 19, whose bulk would obstruct the normal activity of the lateral cranes of the ship deck.

On the other hand, the second embodiment allows lifting reels 5, even of small size, to the height of alignment with the hub-carrying groups 7, preventing the use of spacers for lifting the supports saddles for the reels (with which they are loaded on the deck of the ship and placed between the shoulders of the apparatus).

The operations for overturning the movable support group between the two towers 19 constituted by the hub-carrying group 7, by the first movement actuators 16 and by the reaction bar 13, are easily obtained with FIFO logic. It is initially provided to remove the small upper reinforcing beam 200 placed to connect between the two towers 19, and then unthread the group from the seat by means of lifting of the crane, engaging on two eyebolts. At this point, the insertion is reversed of the sequence of the three members constituted by the hub-carrying group 7, by the first movement actuators 16 and by the reaction bar 13 and thus one easily passes from one configuration to another.

Also forming the object of the present invention is a method for loading a reel on an apparatus for unwinding flexible cables on seabeds, advantageously, but not in a limited manner, obtained according to the above-described characteristics; the same reference numbers will be maintained hereinbelow for simplicity of description.

Such method comprises the operative steps described hereinbelow.

First of all, a step is provided for moving apart the shoulders 4 of the apparatus 1 in order to allow the subsequent step of positioning the reel 5 to take place; such reel 5 has been previously advantageously mounted on a metalwork support saddle, between the spread shoulders 4 of the apparatus 1.

Once brought onto the deck of a ship by means of a wharf crane, the reel 5 mounted on its saddle is moved between the shoulders 4 of the apparatus 1 for example by means of the lateral crane of the deck or by means of a bridge crane.

At this point, there is the step of positioning the two hub-carrying groups 7 in a position aligned with the ends of the reel 5 mounted on the saddle.

Such step occurs according to the idea underlying the present invention by means of achieving the following stages in succession:

a first stage for the selective actuation, simultaneously for each shoulder 4, of the first or second locking means 14, 15 into the non-interference position B, B', freeing from an anchoring element 12 a corresponding first member selected from among the hub-carrying group 7 and the reaction bar 13;

a second stage for the actuation of the first movement actuators 16 in order to move the freed first member 7 or 13 by a segment equal to the distance D between two anchoring elements 12 in succession or to a multiple of such distance D;

a third stage for the actuation of the locking means 14, 15 correspondingly mounted on the freed first member 7 or 13, from the non-interference position B, B' to the interference position A, A', thus locking such previously freed first member at a subsequent anchoring element 12 arranged in the direction of movement Y;

a fourth stage for the actuation of the locking means 15, 14 correspondingly mounted on the second member 13, 7, i.e. the other member that has not been freed in the previous stage, into the non-interference position B', B, freeing such member from the relative anchoring element 12;

a fifth stage for the actuation of the first movement actuators 16 in order to move the freed second member 13, 7 by a segment equal to the distance between the two anchoring elements 12 in succession or to a multiple of such distance;

a sixth stage for the actuation of the locking means 15, 14 correspondingly mounted on the freed second member 13, 7, in order to bring them back into the interference position A', A, locking the freed second member 13, 7 at a subsequent anchoring element 12 in the direction of movement Y.

The first selective actuation stage will be selected for freeing the member that must be moved towards the alignment position and that, as a function of the elongated or retracted state of the first movement actuators 16, can be constituted by one of the two members from among the hub-carrying group 7 and the reaction bar 13. Starting from an initial situation with the first actuators 16 in retracted position, the member to be moved, and thus freed in advance, will be that which is closer to the alignment position, towards which one must turn in order to bring the reel 5 to engage with the hub-carrying groups 7.

The above-indicated stages of the positioning step can be cyclically repeated until the hub-carrying groups 7 are brought into a position substantially aligned with the ends of the reel 5.

Once the aforesaid alignment has been reached, there will be a step of mutual moving closer of the shoulders 4 with the engagement of the hub-carrying groups 7 in the ends of the reel 5. Such step will be obtained by actuating the second actuators 31 interposed between the base block 2 and the base 30 of the shoulder 4.

After having carded out a quick but rough adjustment of the position of the hub-carrying groups 7 with respect to the reel 5, a finer and more precise adjustment can be advantageously provided for the position of the hub-carrying group 7, wherein the latter is moved by the first actuators 16 into an intermediate position between two anchoring elements 12, which can be mechanically sealed in safe conditions, by screwing a ring nut on a thread (e.g. of trapezoidal type) obtained on the terminal part of the stem of the actuator 16 (which in such case is advantageously constituted by a hydraulic piston), thus to obtain a mechanical locking without using the hydraulic seal of the actuator 16 itself.

FIGS. 25-31 schematically illustrate an operating sequence aimed to lift the hub-carrying groups 7 towards the position of alignment with a reel (not shown).

Figure 26:
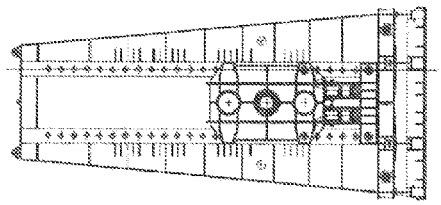
Figure 26:
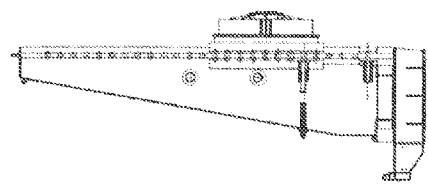
Figure 25:
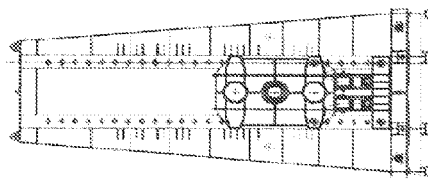
Figure 25:
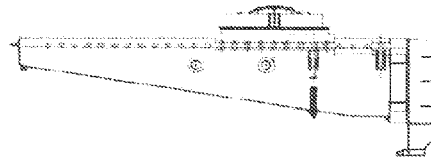
Figure 28:
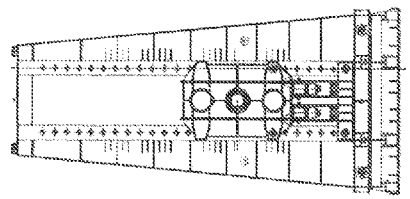
Figure 28:
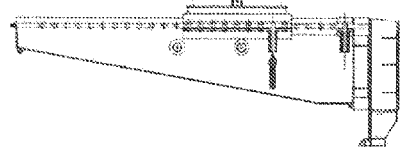
Figure 27:
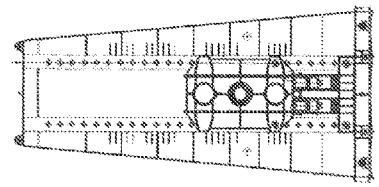
Figure 27:
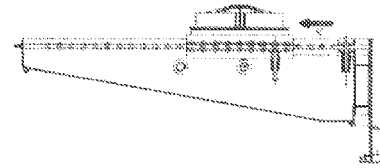
Figure 30:
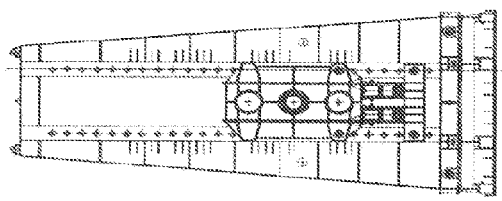
Figure 30:
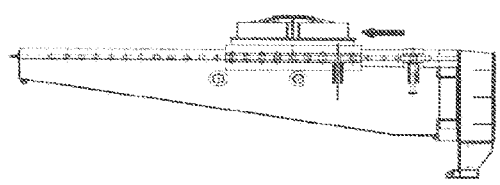
Figure 31:
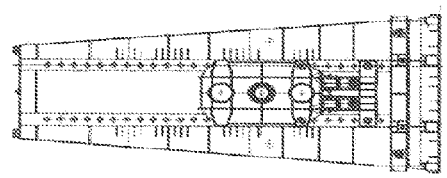
Figure 31:
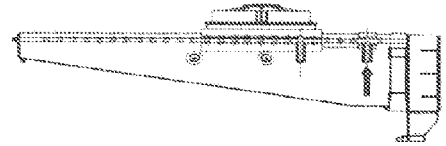
Figure 29:
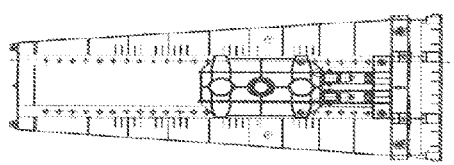
Figure 29:
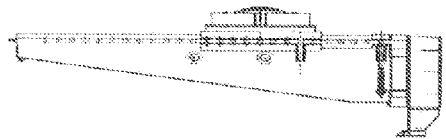

In accordance with such figures and with the above-indicated sequence of stages, starting from an initial situation with the first actuators 16 in retracted position (FIG. 25), it is first provided to free the hub-carrying group 7 (placed in accordance with this embodiment on the upper part of the reaction bar 13, see FIG. 26), to lift the same hub-carrying group 7 by actuating the first actuators 16 (see FIG. 27), then to lock it in a new, higher position (e.g. higher by a segment equal to the distance between two holes 12 as indicated in FIG. 28) and then to return the reaction bar 13 (placed as stated in this case on the lower part), freeing it first from the second locking means 15 (see FIG. 29), then lifting it by an equal pitch with the first actuators 16 (FIG. 30), before then returning to lock it in a higher position as indicated in FIG. 31.

A logic control unit is advantageously provided for, connected to the first and the second actuators 16, 31 as well as to the first and second locking means 14, 15 in order to coordinate the above-listed operations in a correct operating sequence aimed to achieve the expected movement.

Preferably, diagnostic means are provided for, adapted to detect the position of the hub-carrying groups 7 and of the reaction bars 13 along the extension of the towers 19, in particular for defining the correct position of the locking means 14, 15 with respect to the anchoring elements 12 and in particular of the stems 27 of the cylinders with through stem with respect to the holes 12, so as to allow the correct insertion thereof at their interior.

For such purpose, capacitive sensors can be provided for, connected to the logic control unit and mounted on the hub-carrying groups 7 and/or on the reaction bars 13 adapted to read the same holes or equivalent signaling elements placed alongside the holes 12.

Otherwise, first actuators 16 can be used that consist of pistons feedbacked in position by means of a linear sensor, such as a magnetostrictive sensor, or by means of other equivalent sensors.

In any case, an encoder is also advantageously provided for, it too connected to the control unit and tied to the movement of the first actuators, for a detection of the absolution position thereof.

The finding thus conceived therefore attains the pre-established objects.

The invention claimed is:

1. An apparatus for unwinding flexible cables on seabeds, comprising:

a reel for storing a wound flexible cable;

a support structure provided with a base block and two shoulders, which rise from said base block parallel and spaced apart from each other in a main vertical extension direction;

two hub-carrying groups, each of which is slidably guided along a corresponding said shoulder in said vertical extension direction, and is susceptible to be mechanically engaged with one end of said reel;

a plurality of anchoring elements aligned along said vertical extension direction;

at least two movable reaction bars, each of which is slidably mechanically guided on a corresponding said shoulder along said vertical extension direction;

two first locking means, each mounted on a corresponding said hub-carrying group and able to be actuated to move between a first interference position, in which they intercept at least one anchoring element, constraining said hub-carrying group to said shoulder with respect to movements along said vertical extension direction, and a first non-interference position, in which they are released from the anchoring elements, freeing said hub-carrying group from said shoulder with respect to movements along said vertical extension direction;

two second locking means, each mounted on a corresponding said reaction bar and able to be actuated to move between a second interference position, in which they intercept at least one anchoring element, locking said reaction bar to said shoulder with respect to movements along said vertical extension direction, and a second non-interference position, in which they are released from the anchoring elements, freeing said reaction bar from said shoulder with respect to movements along said vertical extension direction; and at least two first movement actuators, each of which is mounted between one said hub-carrying group and one said corresponding reaction bar in order to modify the distance between them with at least one of said first and second locking means in non-interference position, wherein each first movement actuator is arranged to modify the distance between the relative hub-carrying group and the corresponding reaction bar, when, selectively, a member selected from among the hub-carrying group and the reaction bar has the corresponding locking means in non-interference position, so as to allow the movement of the member under the action of the corresponding first actuator, and each first movement actuator is arranged to move the member with successive travel segments equal to the distance between two anchoring elements or for a multiple travel of such distance.

2. The apparatus for unwinding flexible cables on seabeds according to claim 1, wherein said anchoring elements consist of a plurality of aligned holes provided for on at least one wall of each said shoulder, being substantially extended along said vertical extension direction.

3. The apparatus for unwinding flexible cables on seabeds according to claim 1, wherein each said shoulder is formed by two parallel towers delimiting, together with said base block, a seat in which said hub-carrying group is housed, said towers being provided with two first counter-facing sliding guides, in which said hub-carrying group is slidably engaged.

4. The apparatus for unwinding flexible cables on seabeds according to claim 3, wherein each said reaction bar is housed slidably engaged in a corresponding second sliding guide of said towers.

5. The apparatus for unwinding flexible cables on seabeds according to claim 4, wherein inside each said seat, the following are housed in sequence and in order starting from said base block: one said reaction bar, at least one said first movement actuator and one said first hub-carrying group.

6. The apparatus for unwinding flexible cables on seabeds according to claim 4, wherein inside each said seat, the following are housed in sequence and in order starting from said base block: one said first hub-carrying group, at least one said first movement actuator and one said reaction bar.

7. The apparatus for unwinding flexible cables on seabeds according to claim 3, further comprising two projecting walls each fixed to one said tower being extended inside said seat towards the other tower, said projecting walls each having associated said plurality of aligned anchoring elements, being extended along said vertical direction and being housed between first and second plates that are spaced apart and parallel and laterally fixed respectively to said hub-carrying group and to said reaction bar in order to guide the movement thereof along said vertical direction, said first and said second locking means being mounted respectively on at least one of said first and second plates, at said anchoring elements in order to be engaged therewith when said first and second locking means are actuated respectively to move into said first and/or second interference position.

8. The apparatus for unwinding flexible cables on seabeds according to claim 1, wherein said first and second locking means each comprise at least one third actuator provided with fixed jacket respectively integral with said hub-carrying group and with said reaction bar, and with a movable stem carrying at least one associated stop element able to be actuated to project towards said shoulder in order to interfere with said anchoring elements when said first and second locking means are respectively actuated to move into said first and/or second interference position.

9. The apparatus for unwinding flexible cables on seabeds according to claim 1, wherein each said shoulder can be moved towards or away from the other shoulder by at least one second actuator interposed between said fixed base block and said shoulder slidably movable on said base block.

10. A method for loading a reel on an apparatus for unwinding flexible cables on seabeds according to claim 1, which comprises the following operative steps:

a step of moving apart said shoulders;

a step of positioning said reel mounted on a metalwork support saddle, by a crane, between said spread shoulders;

a step of positioning said hub-carrying groups in an aligned position with the ends of said reel by achieving:

a first stage for the selective actuation, simultaneously for each shoulder, of said first or said second locking means into said non-interference position, freeing from an anchoring element a corresponding first member selected from among said hub-carrying group and said reaction bar, a second stage for the actuation of said first movement actuators in order to move said freed first member by a segment equal to the distance between two said anchoring elements in succession or to a multiple of such distance, a third stage for the actuation of the locking means correspondingly mounted on said freed first member into said interference position, locking said freed first member in a subsequent anchoring element in the direction of said movement, a fourth stage for the actuation of the locking means correspondingly mounted on the second member that has not been freed in the previous stage into said non-interference position, freeing it from one said corresponding anchoring element,
- a fifth stage for the actuation of said first movement actuators in order to move said freed second member by a segment equal to the distance between two said anchoring elements in succession or to a multiple of such distance, and
- a sixth stage for the actuation of the locking means correspondingly mounted on said freed second member into said interference position, locking said freed second member in a subsequent anchoring element in the direction of said movement, a step for the cyclic repetition of the stages of said positioning step, until said hub-carrying group is brought into a position aligned with the ends of said reel; and a step of bringing together the shoulders with engagement of said hub-carrying groups in the ends of said reel.

11. The method for loading a reel according to claim 10, which provides for a step of fine regulation of the position of said hub-carrying group, in which the latter is moved by said first actuators into an intermediate position between two anchoring elements, in particular being mechanically lockable in such position.

* * * * *

UNITED STATES PATENT AND TRADEMARK OFFICE
CERTIFICATE OF CORRECTION

PATENT NO. : 9,586,785 B2  
APPLICATION NO. : 14/583135  
DATED : March 7, 2017  
INVENTOR(S) : Andrea Tiberio et al.

Page 1 of 1

It is certified that error appears in the above-identified patent and that said Letters Patent is hereby corrected as shown below:

In the Claims

Claim 2, Column 11 should be corrected as follows:  
Line 55:  
The word substantially should be omitted.

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*